(12) United States Patent
Iannetti

(10) Patent No.: US 11,274,755 B2
(45) Date of Patent: Mar. 15, 2022

(54) VALVE

(71) Applicant: WEIR GROUP IP LIMITED, Glasgow (GB)

(72) Inventor: Aldo Iannetti, Glasgow (GB)

(73) Assignee: WEIR GROUP IP LIMITED, Glasgow (GB)

( * ) Notice: Subject to any disclaimer, the term of this patent is extended or adjusted under 35 U.S.C. 154(b) by 0 days.

(21) Appl. No.: 16/632,534

(22) PCT Filed: May 24, 2018

(86) PCT No.: PCT/IB2018/053687
§ 371 (c)(1),
(2) Date: Jan. 20, 2020

(87) PCT Pub. No.: WO2019/016621
PCT Pub. Date: Jan. 24, 2019

(65) Prior Publication Data
US 2020/0191286 A1     Jun. 18, 2020

(30) Foreign Application Priority Data

Jul. 21, 2017 (GB) ..................................... 1711742

(51) Int. Cl.
*F16K 15/02*  (2006.01)
*F04B 53/10*  (2006.01)

(52) U.S. Cl.
CPC ............ *F16K 15/028* (2013.01); *F04B 53/10* (2013.01); *Y10T 137/7866* (2015.04); *Y10T 137/7867* (2015.04); *Y10T 137/7868* (2015.04)

(58) Field of Classification Search
CPC .. F04B 53/102; F04B 53/1087; F04B 1/0404; F04B 53/10; F16K 15/028; Y10T 137/7868; Y10T 137/7867
See application file for complete search history.

(56) References Cited

U.S. PATENT DOCUMENTS 1,687,860 A  *  10/1928  Fosnaugh ........... F04B 53/1087
                                                        137/543.13
1,873,318 A  *   8/1932  Eason, Jr. ........... F04B 53/1027
                                                        137/533.21

(Continued)

FOREIGN PATENT DOCUMENTS

| FR | 2725490 | 4/1996 |
| GB | 930908 | 7/1963 |
| WO | WO 1999/022282 | 5/1999 |

*Primary Examiner* — Umashankar Venkatesan
(74) *Attorney, Agent, or Firm* — Steven Schad

(57) ABSTRACT

A valve for a positive displacement pump, a valve seat, a valve body for use therewith, and a pump comprising such a valve are described. The valve comprises a valve body and a valve seat each having engagement surfaces which are configured, in use, to at least partially engage with one another when the valve is in a closed position to thereby mitigate fluid flow therethrough. The valve body is movable, in use, relative to the valve seat along a linear path of motion from the closed position to an open position, wherein at least a peripheral portion of the engagement surface of the valve body extends at an obtuse angle relative to the linear path of motion in the direction of motion from the closed position to the open position and wherein the length of the peripheral portion is at least 13% of the length of the engagement surface.

14 Claims, 8 Drawing Sheets

(56) References Cited

U.S. PATENT DOCUMENTS

| | | | | |
|---|---|---|---|---|
| 2,093,662 A | * | 9/1937 | Steirly | F04B 53/1027 |
| | | | | 137/516.29 |
| 2,131,928 A | * | 10/1938 | Abegg | F04B 53/102 |
| | | | | 137/516.29 |
| 3,039,488 A | * | 6/1962 | Bowerman | F16K 1/46 |
| | | | | 137/516.29 |
| 3,742,976 A | * | 7/1973 | Bailey | F16K 1/46 |
| | | | | 137/516.29 |
| 4,479,508 A | | 10/1984 | Breed | |
| 4,922,957 A | * | 5/1990 | Johnson | F16K 1/46 |
| | | | | 137/516.29 |
| 4,951,707 A | | 8/1990 | Johnson | |
| 6,701,955 B2 | | 3/2004 | McIntire et al. | |
| 8,317,498 B2 | | 11/2012 | Gambier et al. | |
| 2017/0342976 A1 | * | 11/2017 | Nagaraja Reddy | F04B 15/02 |

* cited by examiner

VALVE

This invention relates generally to valves and more particularly to valves for positive displacement pumps and to positive displacement pumps incorporating such valves.

Positive displacement pumps find use in a multiplicity of operations in which it is necessary to move fluid from one place to another. One such use is to be found in the petrochemical industry where such pumps may find use in the circulation of drilling fluids or muds when drilling boreholes. Another use is in the minerals industry where such pumps are used for pumping tailings.

A positive displacement pump 1˜ may comprise an inlet 2˜ and an outlet 3˜ in fluid communication with a variable volume chamber 4˜, as shown in FIG. 1.

A first valve 5˜, comprising a first valve body 50˜ and first valve seat 51, may be configured to selectively open and close fluid communication between the inlet 2˜ and the variable volume chamber 4˜, whilst a second valve 6˜, comprising a second valve body 60˜ and second valve seat 61˜, may be configured to selectively open and close fluid communication between the outlet 3˜ and the variable volume chamber 4˜. The valve bodies 50˜, 60˜ of the first and second valves 5˜, 6˜ are biased to a closed condition by respective compression springs S1˜, S2˜. The compression spring S1˜ biasing the first valve body 50˜ to a closed condition is located within the variable volume chamber 4˜. The compression spring S1˜ is arranged to act at one of its ends against a first, downstream surface 52˜ of the valve body 51˜. The other end of the compression spring S1˜ acts against a retaining member 8˜ which is downstream of the valve body 51˜ and is also located within the variable volume chamber 4˜.

A positive displacement pump 1˜ may comprise a plunger 7˜ arranged to extend into the variable volume chamber 4˜ and to move linearly and reciprocally in the directions of arrows A1, A2 such that the volume of the variable volume chamber 4˜ is sequentially increased and then decreased. The plunger 7˜ is movable in a direction which is perpendicular to the direction of motion of the first and second valve bodies 50˜, 60˜, in use, when moving from the closed condition to an open condition. Reciprocal movement of the plunger 7˜ may be actuated by the plungers free end (not shown) acting against a cam (not shown) which is rotated by a motor or other prime mover (not shown). The skilled person will appreciate that other mechanisms for actuating movement of the plunger 7˜ may be provided.

In use, movement of the plunger 7˜ away from the top dead centre position (as shown in FIG. 1) acts to relatively increase the volume in the variable volume chamber 4˜. Consequently, the pressure within the variable volume chamber 4˜ is relatively reduced. When the pressure differential across the first valve 5˜ generates an urging force on the first valve 5˜ which exceeds the biasing force of the spring S1˜ the first valve body 50˜ moves away from the first valve seat 51˜ such that the valve 5˜ moves out of a closed condition and toward an open condition. Relatively higher pressure fluid flows through the inlet 2˜, through the open first valve 5˜, and into the variable volume chamber 4˜. Fluid flows into the variable volume chamber 4˜, through the open first valve 5˜, and into the variable volume chamber 4˜. As the plunger 7˜ continues on its travel flow continues into the variable volume chamber 4˜. As the plunger gets to or approaches the end of its travel (e.g. at bottom dead centre position) the pressure differential across the first valve 5˜ decreases until the urging force on the valve 5˜ no longer generates an urging force which exceeds the biasing force of the spring S1˜. The first valve 5˜ then moves back toward the closed condition, biased by the biasing force of the spring S1˜. When the plunger 7˜ reaches bottom dead centre the volume of the variable volume chamber 4˜ is increased to its maximum volume.

The plunger 7˜ is then actuated to move back from bottom dead centre toward top dead centre, thereby relatively reducing the volume of the variable volume chamber 4˜. The pressure of fluid within the variable volume chamber 4˜ is thence relatively increased. When the pressure differential across the second valve 6˜ generates an urging force on the second valve body 60˜ which exceeds the biasing force of the spring S2˜ the second valve body 60˜ is urged to move away from a closed condition with respect to the second valve seat 61˜. The second valve body 60˜ moves relative to the second valve seat 61˜ along a linear path of motion from the closed condition or position to an open condition or position (as shown in FIGS. 2 and 3). Fluid from within the variable volume chamber 4˜ thereby flows through the open second valve 6˜ and through the outlet 3˜. As will be appreciated, the first valve 5˜ is in a closed condition during this discharge phase and consequently fluid does not flow to the inlet 2˜.

As shown in FIGS. 2 and 3 in greater detail, the second valve body 60˜ and the second valve seat 61˜ each, respectively, comprise engagement surfaces 60a˜, 61a˜ which are configured, in use, to at least partially engage with one another when the second valve 6˜ is in the closed condition or position (to thereby mitigate or prevent fluid flow therethrough). The second valve body 60˜ is movable, in use, relative to the second valve seat 61˜ along a linear path of motion L from the closed condition or position to an open condition or position.

The engagement surface 60a˜ of the second valve body 60˜ typically extends at an acute angle relative to the linear path of motion L in the direction of motion from the closed position or condition to the open position or condition. The acute angle may be between about 30 degrees and 60 degrees. The engagement surface 61a˜ of the second valve seat 61˜ also typically extends at an acute angle φ relative to the linear path of motion in the direction of motion from the closed condition or position to the open condition or position. The acute angle φ may be between about 30 degrees and 60 degrees.

The angles, φ, by which the engagement surface 60a˜ and the engagement surface 61a˜ extend, help to militate against axial forces acting against the obverse surface of the second valve body 60˜ to the engagement surface 60a˜ and urging the second valve 6˜ to remain in the closed condition. The engagement surface 60a˜ of the second valve body 60˜ defines a convex shape in the direction of the linear path of motion L from the closed position to the open position.

The second valve 6˜ may also comprise a conformable portion 62˜ on or in a peripheral or outer portion of the engagement surface 60a˜ of the second valve body 60˜. The conformable portion 62˜ has a leading face which is parallel to the inner portion of the engagement surface 60a˜. The conformable portion 62˜ may comprise a sealing member 62˜. The conformable portion may be formed from a different material than the material(s) from which the remainder of the second valve body 60˜ is formed. The conformable portion 62˜ typically comprises a conformable and/or resilient material, for example rubber. The conformable portion 62˜ is configured to deform against the second valve seat 61˜ (which may be formed from a relatively less conformable and/or resilient material, such as steel) when the second valve body 60˜ moves to the closed condition. Accordingly, the conformable portion 62˜ is arranged to provide a fluid tight seal between the second valve body 60˜ and the second valve seat 61˜ when the second valve 6˜ is in the closed condition.

Second valves 6˜ of the above described type have relatively high wear rates.

Sometimes there is a generation of cavitation, especially during the initial lifting of the second valve body 60˜ from the second valve seat 61˜. Such cavitation results in less efficient operation of the pump 1˜ and may result in enhanced wear of the components of the pump 1˜ and hence a reduced useful lifetime thereof.

It is therefore a first non-exclusive object of the invention to provide a valve which at least partially mitigates one or more of the above-identified problems and/or which is otherwise improved over prior art valves.

Accordingly, a first aspect of the invention provides a valve for a positive displacement pump, the valve comprising a valve body and a valve seat each having engagement surfaces which are configured, in use, to at least partially engage with one another when the valve is in a closed condition or position to thereby mitigate or prevent fluid flow therethrough, the valve body being movable, in use, relative to the valve seat along a linear path of motion from the closed condition or position to an open condition or position, wherein at least a peripheral portion of the engagement surface of the valve body extends at an obtuse angle relative to the linear path of motion in the direction of motion from the closed condition or position toward the open condition or position and wherein the length of the peripheral portion is at least 13% of the length of the engagement surface.

As used herein, the word 'to_ when used in terms such as A moving to B, includes A moving towards, but not reaching, B; and A moving all the way to B so that A is in contact with B.

This aspect thus provides a valve which moves to an open condition or position having a relatively increased valve gap between the engagement surfaces of the valve body and the valve seat relative to prior art valves exposed to the same fluid flow conditions (e.g. fluid pressure within the variable volume chamber).

Due to the shape of the at least peripheral portion of the engagement surface of the valve body the velocity of the flow of fluid through the valve is relatively reduced (compared to prior art valves of the type described above when exposed to the same fluid flow conditions). Accordingly, during opening of the valve the pressure of fluid adjacent the valve body is relatively increased with respect to prior art valves. Consequently, the valve body is lifted to a relatively greater valve gap (between the engagement surfaces of the valve body and valve seat) with respect to the valve seat than occurs in prior art valves of the above described type. However, the length of the peripheral portion should be a non-negligible percentage of the length of the engagement surface for this beneficial effect to be noticeable. Some prior art valves (such as the one disclosed in U.S. Pat. No. 2,178,876) included a small peripheral portion configured at an obtuse angle, but such a small peripheral portion would not have any practical or useful effect in preventing cavitation and appears to have been provided to ensure a tight fit between the valve body and the valve seat.

The length of the peripheral portion may be at least 13% of the length of the total engagement surface. Various tests indicate that an optimum length depends on the operating conditions and on the l angle (FIG. 5*b*) and ranges between 13% and 67% of the length of the engagement surface, below 13% the flow deviation is too poor to give benefits and above 67% the flow deviation generates pressure loss which increases cavitation as in the prior art valves. It is believed that this relatively increased valve gap at least partially mitigates the formation of cavitation and erosion. Moreover, with a relatively increased valve gap a reduced percentage of the fluid flow contacts the engagement surfaces of the valve body and valve seat when flowing therethrough. Accordingly, the wear rate of the valve is relatively reduced. Such a reduced wear rate beneficially provides for a relatively longer service life of the valve with a consequential reduction in expense of replacement valves and downtime of pumps and systems to which such pumps are connected.

A further aspect of the invention provides a valve body for use with a valve seat, the valve body comprising an engagement surface configured, in use, to at least partially engage with an engagement surface of the valve seat when a valve formed by the valve body and the valve seat is in a closed condition or position such that fluid flow therethrough is mitigated or prevented, the valve body being movable, in use, relative to the valve seat along a linear path of motion from the closed condition or position to an open condition or position, wherein at least a peripheral portion of the engagement surface of the valve body extends at an obtuse angle relative to the linear path of motion in the direction of motion from the closed condition or position to the open condition or position.

At least a peripheral portion of the engagement surface of the valve seat may extend perpendicularly or at an obtuse angle relative to the linear path of motion in the direction of motion from the closed condition or position to the open condition or position.

When the valve body and valve seat are fitted to one another the peripheral portion of the engagement surface of the valve body may extend at an angle of between about 5 and 20 degrees (say between about 2, 3, 4, 6, 7, 8, 9 or 10 and 15, 16, 17, 18 or 19 degrees) relative to the peripheral portion of the engagement surface of the valve seat.

The obtuse angle by which the peripheral portion of the engagement surface of the valve body extends may be between about 91 and 170 degrees relative to the linear path of motion in the direction of motion from the closed condition or position to the open condition or position, for example between about 95, 96, 97, 98, 99, 100 and 105, 106, 107, 108, 109, 110, 111, 112, 113, 114, 115, 116, 117, 118, 119, 120, 125, 130, 135, 140 or 150 degrees relative to the linear path of motion in the direction of motion from the closed condition or position to the open condition or position. The obtuse angle by which the peripheral portion of the engagement surface of the valve body extends is configured, in use, to generate relatively greater lift of the valve body relative to the valve seat (for example relative to prior art valves).

A yet further aspect of the invention provides a valve seat for use with a valve body to thereby form a valve, the valve seat comprising an engagement surface configured, in use, to at least partially engage with an engagement surface of the valve body when a valve formed by the valve seat and the valve body is in a closed condition or position such that fluid flow therethrough is mitigated or prevented, the valve body being movable, in use, relative to the valve seat along a linear path of motion from the closed condition or position to an open condition or position, wherein the engagement surface of the valve seat comprises an inner portion and a peripheral portion, where the inner portion extends at an acute angle relative to the linear path of motion and at least the peripheral portion extends perpendicularly or at an obtuse angle relative to the linear path of motion in the direction of motion from the closed condition or position toward the open condition or position.

A further aspect of the invention provides a valve seat for use with a valve body to thereby form a valve, the valve seat comprising an engagement surface configured, in use, to at least partially engage with an engagement surface of the valve body when a valve formed by the valve seat and the valve body is in a closed condition or position such that fluid flow therethrough is mitigated or prevented, the valve body being movable, in use, relative to the valve seat along a linear path of motion from the closed condition or position to an open condition or position, wherein at least a peripheral portion of the engagement surface of the valve seat extends at an obtuse angle relative to the linear path of motion in the direction of motion from the closed condition or position toward the open condition or position.

The obtuse angle by which the peripheral portion of the engagement surface of the valve seat extends may be between about 91 and 170 degrees relative to the linear path of motion in the direction of motion from the closed condition or position to the open condition or position, for example between about 95, 96, 97, 98, 99, 100 and 105, 106, 107, 108, 109, 110, 111, 112, 113, 114, 115, 116, 117, 118, 119, 120, 125, 130, 135, 140 or 150 degrees relative to the linear path of motion in the direction of motion from the closed condition or position to the open condition or position.

The valve body may be generally circular, in plan. The valve body may be formed from metal, for example from steel, aluminium, iron, etc. The valve body may be formed by casting, machining and/or additive manufacturing or by any other suitable process.

The engagement surface of the valve body may comprise an inner portion and an outer portion. The outer portion may comprise the peripheral portion.

The inner portion of the engagement surface of the valve body may extend at an acute angle relative to the linear path of motion in the direction of motion from the closed condition or position toward the open condition or position. The acute angle may be between about 20 and 70 degrees (for example between about 21, 22, 23, 24, 25, 26, 27, 28, 29 or 30 and 60, 61, 62, 63, 64, 65, 66, 67, 68 or 69 degrees) relative to the linear path of motion in the direction of motion from the closed condition or position toward the open condition or position.

The outer portion of the engagement surface of the valve body may extend at an obtuse angle with respect to the linear path of motion in the direction of motion from the closed condition or position toward the open condition or position. The obtuse angle may be between about 91 and 170 degrees relative to the linear path of motion, for example between about 92, 93, 94, 95, 96, 97, 98, 99, 100 and 105, 106, 107, 108, 109, 110, 111, 112, 113, 114, 115, 116, 117, 118, 119, 120, 125, 130, 135, 140 or 150 degrees relative to the linear path of motion in the direction of motion from the closed condition or position toward the open condition or position.

The engagement surface of the valve body may comprise an internal angle, for example between the inner portion and the outer portion. The outer portion may extend from the inner portion at the internal angle. The internal angle may be an obtuse angle. The internal angle may be between about 90 and 170 degrees, for example between about 95, 96, 97, 98, 99, 100 and 130, 135, 140, 145, 150, 155, 160, 165, 170 degrees.

The engagement surface of the valve body may comprise a concave shape, for example concave in the direction of the linear path of motion from the closed condition or position to the open condition or position.

The valve body may comprise a guider, for example configured to guide motion of the valve body relative to the valve seat, in use. The guider may comprise guide surfaces configured to engage (e.g. slidably) with the valve seat, in use. The guider may be configured or sized or shaped to engage (e.g. slidably) with one or more interior surfaces of the or a valve seat. The guider may be configured, in use, to maintain or guide motion of the valve body relative to the valve seat, e.g. along the linear path of motion.

The valve seat may be generally annular, in plan. The valve seat may be formed from metal, for example from steel, aluminium, iron, etc. The valve seat may be formed by casting, machining and/or additive manufacturing or by any other suitable process.

The engagement surface of the valve seat may comprise an inner portion and an outer portion. The outer portion may comprise the peripheral portion.

The inner portion of the engagement surface of the valve seat may extend at an acute angle relative to the linear path of motion in the direction of motion from the closed condition or position toward the open condition or position. The acute angle may be between about 20 and 70 degrees (for example between about 21, 22, 23, 24, 25, 26, 27, 28, 29 or 30 and 60, 61, 62, 63, 64, 65, 66, 67, 68 or 69 degrees) relative to the linear path of motion in the direction of motion from the closed condition or position toward the open condition or position.

The outer portion of the engagement surface of the valve seat may extend at an obtuse angle or perpendicularly relative to the linear path of motion in the direction of motion from the closed condition or position toward the open condition or position. The obtuse angle may be between about 91 and 170 degrees relative to the linear path of motion in the direction of motion from the closed condition or position toward the open condition or position, for example between about 92, 93, 94, 95, 96, 97, 98, 99, 100 and 105, 106, 107, 108, 109, 110, 111, 112, 113, 114, 115, 116, 117, 118, 119, 120, 125, 130, 135, 140 or 150 degrees relative to the linear path of motion in the direction of motion from the closed condition or position toward the open condition or position.

The engagement surface of the valve seat may comprise an internal angle, for example between the inner portion and the outer portion. The outer portion may extend from the inner portion at the internal angle. The internal angle may be an obtuse angle. The internal angle may be between about 90 and 170 degrees, for example between about 95, 96, 97, 98, 99, 100 and 130, 135, 140, 145, 150, 155, 160, 165, 170 degrees.

The valve, e.g. the valve body or valve seat, may comprise a seal. The seal may be configured to at least partially deform and/or conform when the valve body moves to the closed condition or position relative to the or a valve seat.

The seal may comprise a conformable and/or resilient material. The seal may be at least partially formed from an elastomer (e.g. rubber), urethane, polymer, foam, polystyrene, a composite material or the like. The outer portion of the engagement surface of the valve body may comprise the seal. The seal may comprise a leading surface, for example which at least partially comprises the outer portion of the engagement surface (e.g. of the valve body).

The valve may comprise a biaser, for example configured or arranged to urge the valve body, in use, to the closed condition or position. The biaser may comprise one or more springs, for example compression and/or tension springs. The biaser may comprise a resilient member, for example a member formed from a resilient material and configured or arranged to bias the valve body.

A further aspect of the invention provides a pump comprising a valve or valve body or valve seat as described above.

A yet further aspect of the invention provides a kit of parts comprising a valve body and a valve seat as described above.

A further aspect of the invention provides a kit of parts comprising a valve body, a valve seat and a seal as described above.

Any of the features described herein apply equally to any aspect of the invention.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one aspect or embodiment of the invention are applicable to all aspects or embodiments, unless such features are incompatible.

Embodiments of the invention will now be described by way of example only with reference to the accompanying drawings in which.

Figure 3:
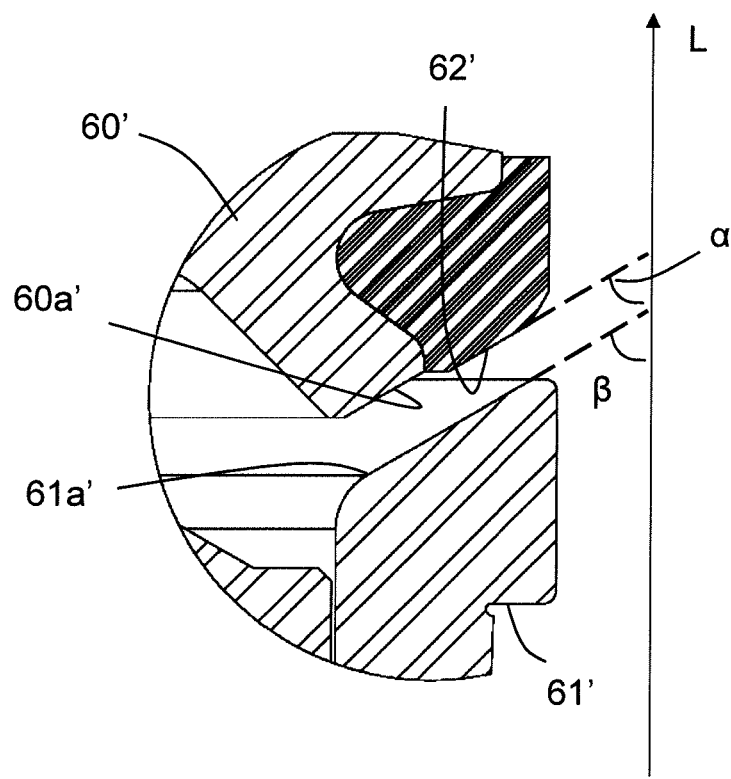
FIG. 3 is an enlarged view of the part of the valve shown in FIG. 2 enclosed by circle A.
Figure 4:
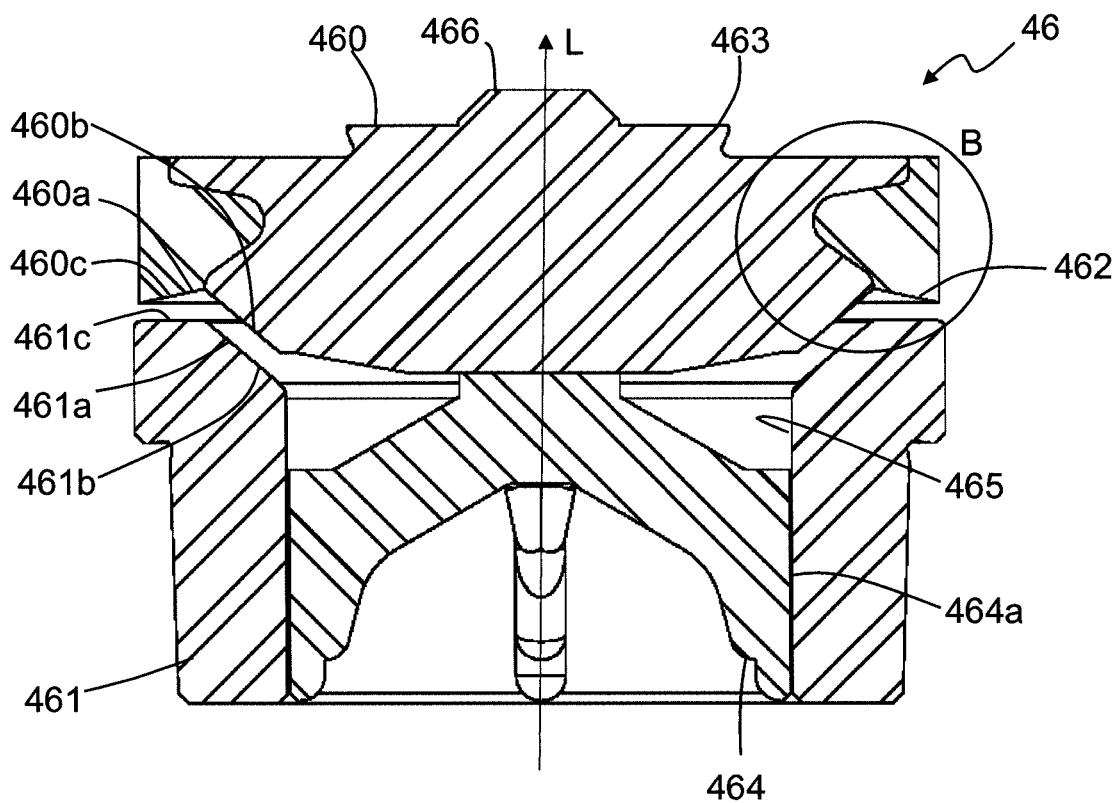
FIG. 4 is a sectional view of a second valve according to an embodiment of the invention.

Referring now to FIGS. 4, 5a, 5b and 5c, there is shown a second valve 46 according to a first embodiment of the invention, wherein like features to those shown in the second valve 6" shown in FIGS. 3 and 4 are denoted by like references absent the prime (″) and preceded by a "4", which will not be described herein further. The second valve 46 comprises a second valve body 460, a second valve seat 461 and a seal 462.

The second valve body 460 and the second valve seat 461 are each formed from steel by casting in this embodiment. However, in embodiments the second valve seat 461 and/or the second valve body 460 may be formed from any suitable material, for example any suitable metal. In embodiments, the second valve seat 461 and/or the second valve body 460 may be formed by any suitable technique, for example machining and/or additive manufacturing.

The second valve body 460 is shaped and dimensioned to be partially receivable, in use, within the second valve seat 461. The second valve body 460 is fitted to the second valve seat 461 prior to use. In use, the second valve body 460 is movable away from a closed condition or position to an open condition or position (as shown in FIG. 4) along a linear path of motion L.

The second valve body 460, in this embodiment, has a generally circular shape, in plan. However, in embodiments, the second valve body 460 may have any suitable shape. The second valve body 460 comprises a valve head 463 with a valve guide 464 attached thereto. The valve guide 464 is shaped and sized such that when the second valve body 460 is fitted to a second valve seat 461 guide surfaces 464a of the valve guide 464 engage with and slidably contact inner surfaces 465 of the second valve seat 461. In this way, the valve guide 464 ensures that the second valve body 460 maintains linear motion away from and toward the closed condition or position relative to the second valve seat 461.

The valve head 463 comprises an engagement surface 460a. The obverse surface 466 of the valve head 463 is configured to be engaged by a biaser, for example a compression spring (not shown).

The engagement surface 460a of the second valve body 460 has an inner and an outer portion 460b, 460c. The outer portion 460c of the engagement surface 460a comprises the peripheral portion of the engagement surface 460a. The outer portion 460c of the engagement surface 460a extends at an obtuse angle ∴ relative to the linear path of motion L in the direction of motion from the closed condition or position toward the open condition or position. The obtuse angle ∴ is between about 91 and 170 degrees relative to the linear path of motion L in the direction of motion from the closed condition or position toward the open condition or position, for example between about 95, 96, 97, 98, 99, 100 and 105, 106, 107, 108, 109, 110, 111, 112, 113, 114, 115, 116, 117, 118, 119, 120, 125, 130, 135, 140 or 150 degrees relative to the linear path of motion L in the direction of motion from the closed condition or position toward the open condition or position.

The inner portion 460c of the engagement surface 460a of the second valve body 460 extends at an acute angle relative to the linear path of motion L in the direction of motion from the closed condition or position toward the open condition or position. The acute angle is between about 20 and 70 degrees (for example between about 21, 22, 23, 24, 25, 26, 27, 28, 29 or 30 and 60, 61, 62, 63, 64, 65, 66, 67, 68 or 69 degrees) relative to the linear path of motion L in the direction of motion from the closed condition or position toward the open condition or position.

The engagement surface 460a of the second valve body 460 comprises an internal angle 僕 between the inner portion 460b and the outer portion 460c. The internal angle 僕 is an obtuse angle and is between about 90 and 170 degrees, for example between about 95, 96, 97, 98, 99, 100 and 130, 135, 140, 145, 150, 155, 160, 165, 170 degrees.

Figure 5A:
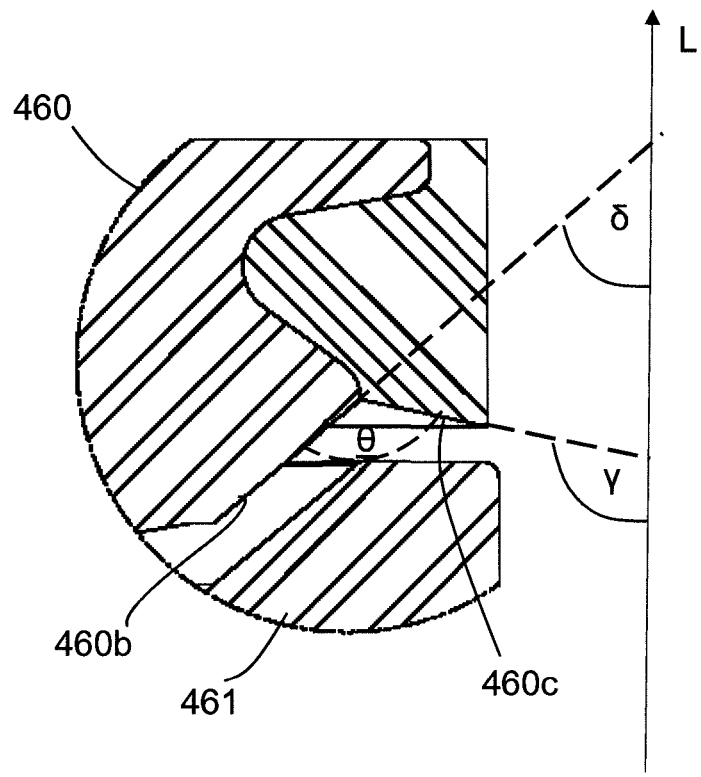
FIGS. 5a, 5b and 5c are enlarged views of the part of the valve shown in FIG. 4 enclosed by circle B.
Figure 5B:
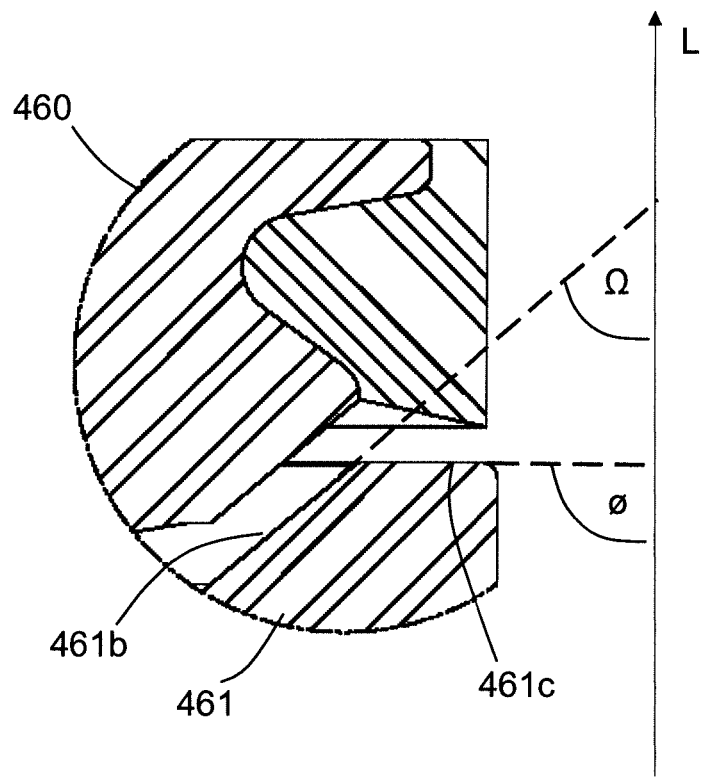
Figure 5C:
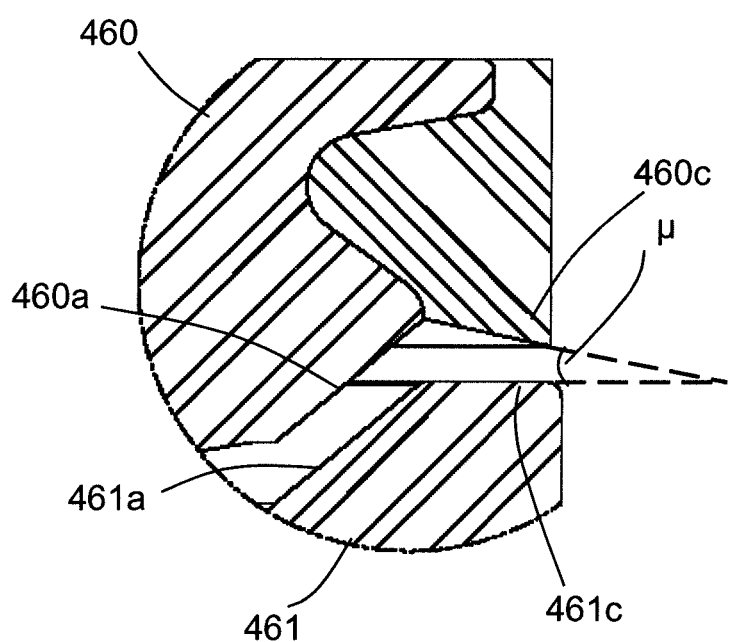

The length of the outer portion 460c is at least 13% of the overall length made by the combination of the radial lengths of 460b and 460c. In FIGS. 5a, b, and c, the length of the outer portion 460c with respect to the overall length is approximately 50%.

The second valve body 460 comprises a seal 462 which is formed from a material which is relatively more conformable than the material(s) from which the remainder of the second valve seat 461 and the second valve body 460 are formed. The seal 462 is formed from rubber in this embodiment. However, in embodiments the seal 462 may be formed from any suitable elastomer, urethane, polymer, foam, polystyrene, a composite material or the like. The outer portion 460c of the engagement surface 460a of the second valve body 460 comprises the seal 462.

The second valve seat 461 comprises an engagement surface 461a which has an inner and an outer portion 461b, 461c. The outer portion 461c of the engagement surface 461a comprises the peripheral portion of the engagement surface 461a. The outer portion 461c of the engagement surface 461a extends perpendicularly or at an angle η relative to the linear path of motion L in the direction of motion from the closed condition or position toward the open condition or position. The angle r is between about 20 and 170 degrees (depending on the angle of the inner portion 461b) relative to the linear path of motion L in the direction of motion from the closed condition or position toward the open condition or position.

The inner portion 461b of the engagement surface 461a of the second valve seat 461 extends at an acute angle ∣ relative to the linear path of motion L in the direction of motion from the closed condition or position toward the open condition or position. The acute angle ∣ is between about 20 and 70 degrees (for example between about 21, 22, 23, 24, 25, 26, 27, 28, 29 or 30 and 60, 61, 62, 63, 64, 65, 66, 67, 68 or 69 degrees) relative to the linear path of motion L in the direction of motion from the closed condition or position toward the open condition or position. The inner portions 460b, 461b of the engagement surfaces 460a, 461a of the second valve body 460 and the second valve seat 461 may extend at the same or similar angles relative to the linear path of motion L in the direction of motion from the closed condition or position toward the open condition or position, and for the same or similar distances.

The obtuse angle ∴ by which the outer portion 460c of the engagement surface 460a of the second valve body 460 extends and the obtuse angle η by which the outer portion 461c of the engagement surface 461a of the valve seat 461 extends are each selected such that, when the second valve body 460 and the second valve seat 461 are fitted to one another the outer portions 460c, 461c define an angle ∣ therebetween of between about 5 and 20 degrees relative to one another.

Figure 1:
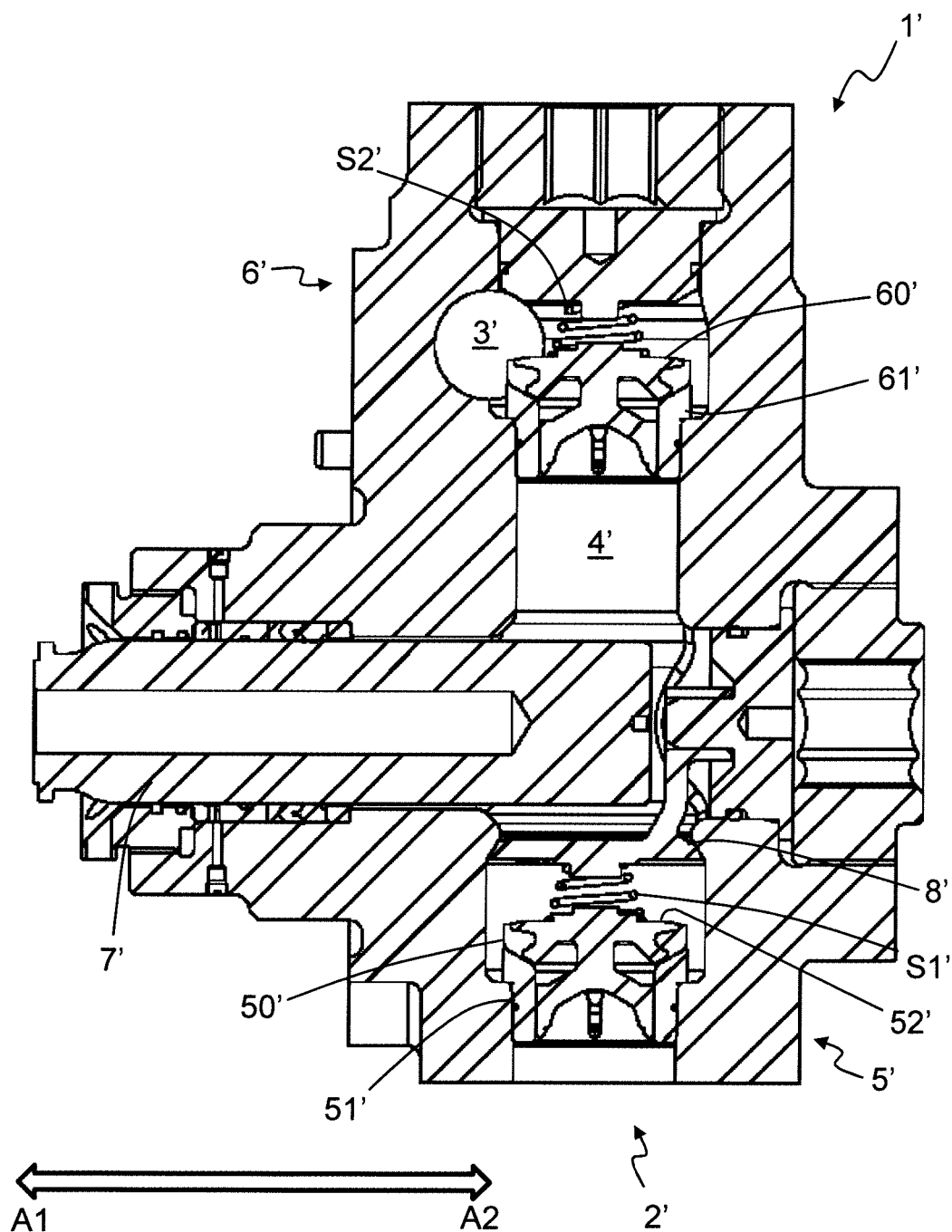
FIG. 1 is a partial sectional view of a prior art positive displacement pump.

The second valve 46 may be installed in a positive displacement pump, for example of the type shown in FIG. 1, where the second valve 46 may replace the second valve 6˜.

In use, when a pressure differential across the second valve body 460 overcomes the biasing force of a spring (or other biaser) the second valve body 460 is caused to move away from the closed condition or position to an open condition, along the linear path of motion L. Accordingly, in the open condition, fluid is able to flow through the valve gap between the engagement surfaces 460a, 461a of the second valve body 460 and the second valve seat 461.

Reference is now made to the following non-limiting and illustrative Test results.

Test Results

Figure 2:
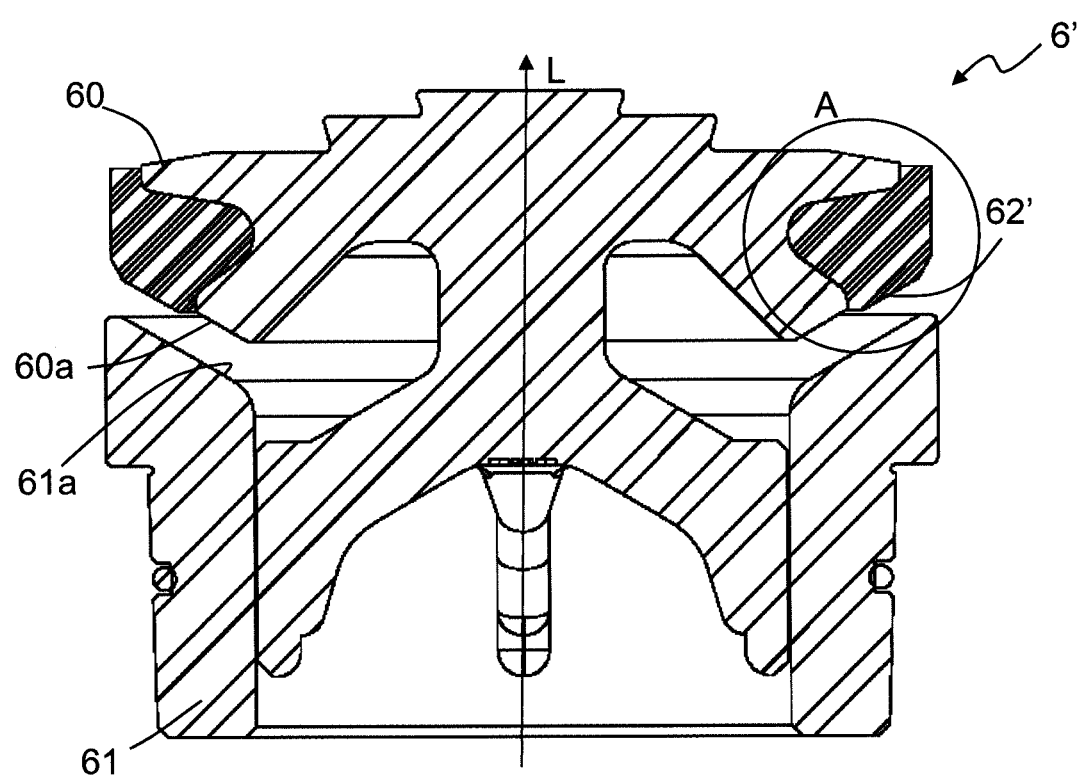
FIG. 2 is a sectional view of the second valve shown in FIG. 1 shown in an open condition or position.
Figure 6:
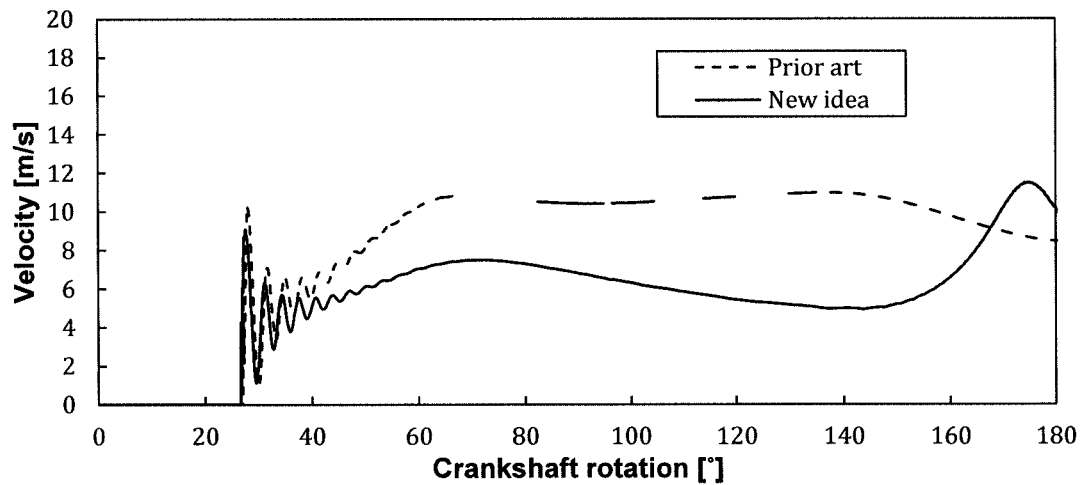
FIGS. 6, 7 and 8 are graphs showing the results of numerically modelling the operation of the second valve shown in FIG. 4.
Figure 7:
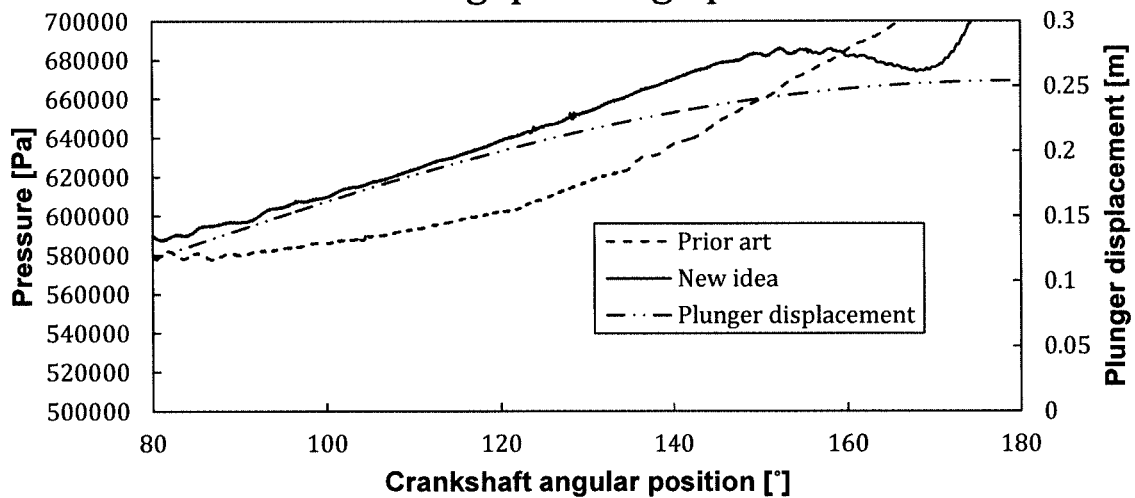
Figure 8:
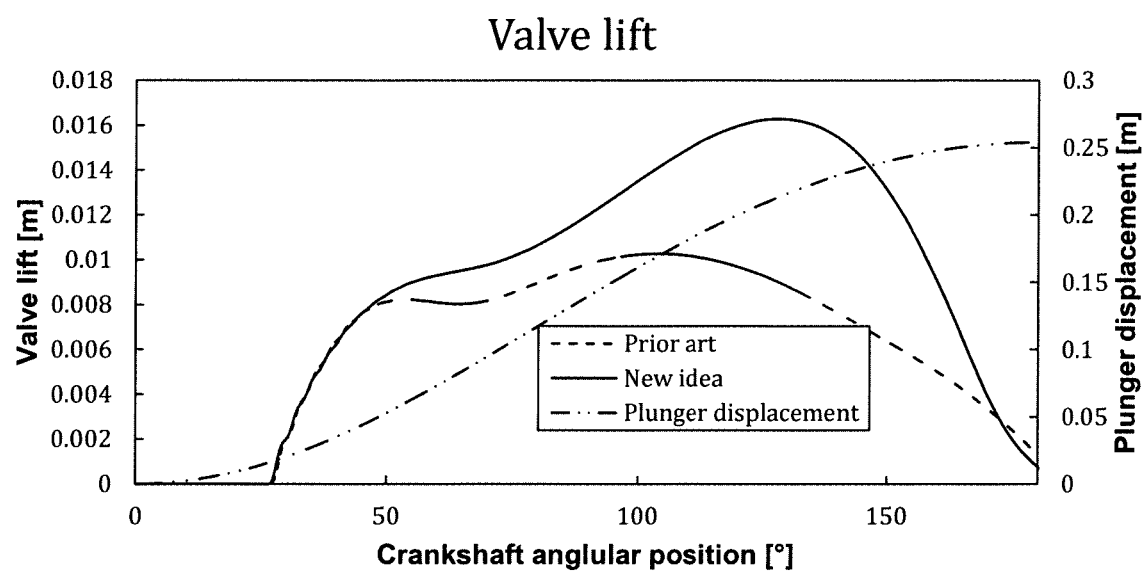

The performance of a second valve 6˜ as shown in FIGS. 2 and 3 and of a second valve 46 as shown in FIGS. 4, 5a, 5b and 5c was modelled using computational fluid dynamics software. The results of these tests are shown in FIGS. 6, 7 and 8, where the results associated with the second valve 6˜ are labelled ∴ Prior art˜ whilst the results associated with the second valve 46 are labelled ∴ New idea˜.

The average flow velocity of fluid exiting the valve gap between the valve seat and the valve body, the average static pressure of fluid in the valve gap during the middle part of the plunger stroke (between 80 degrees and 160 degrees of rotation of the crank to which the plunger is attached) and the maximum valve lift distance, are shown in Table 1, below. In this example the length of peripheral portion is around 50% of the total length of engagement, the angles ∣, ∴ and η are respectively 40ι, 40ι, 102ι and 90ι. The operating conditions are 260 rpm for the crankshaft angular speed and 6.89 Bar (approximately $6.89 \times 10^5$ Pascals) for the suction pressure upstream the valve.

TABLE 1

Calculated valves relating to the opening of the second valves

| | Avg. flow velocity (m/s) | Avg. pressure (Pa) | Max. valve lift (mm) |
|---|---|---|---|
| Second valve 6˜ | 8.7 | 605346 | 10.3 |
| Second valve 46 | 5.7 | 637819 | 16.3 |

As can be seen from Table 1 and from FIG. 6 the average flow velocity of fluid exiting the second valve 46 (shown by a continuous line in FIG. 6) was relatively less than the average flow velocity of fluid exiting the prior art valve 6˜.

Without wishing to be bound by any particular theory it is believed that the shape of the engagement surface 460a of the second valve body 460 acts to slow the flow of fluid therepast. Accordingly, for the same fluid flow conditions (e.g. the same starting fluid pressure within the variable volume chamber 4˜) the flow of fluid through the opening or open second valve 46 is relatively slower than is the flow of fluid through the opening or open second valve 6˜. Consequently, the average static pressure of fluid within the valve gap (between the engagement surfaces 460a, 461a of the second valve body 460 and second valve seat 461) of the second valve 46 is relatively greater than in the prior art valve 6˜, as shown in FIG. 7.

The relatively greater static pressure within the valve gap results in the second valve body 460 being lifted to a greater maximum distance relative to the second valve seat 461 than does the second valve body 60˜ of the second valve 6˜ (as shown in FIG. 8). The second valve body 460 lifted to a maximum distance which is 58% greater than the maximum distance of lift achieved by the second valve body 60˜ of the prior art second valve 6˜. Indeed, the lift distance of the second valve body 460 of the second valve body 46 is greater than the lift distance of the second valve body 60˜ of the second valve body 6˜ during the majority of movement of the plunger (as driven by angular rotation of the crank).

It is believed that cavitation occurs in fluid flow with greater incidence and/or in greater quantity under low pressure, high velocity conditions. Therefore, by reducing the fluid flow velocity and increasing the static pressure cavitation is relatively reduced (with consequential benefits in terms of reduced wear and damage to the second valve 46 and/or associated components). Furthermore, by relatively increasing the valve gap a relatively reduced percentage of fluid flowing through the valve 46 contacts the engagement surfaces 460a, 461a of the second valve body 460 and the second valve seat 461 of the second valve 46. Accordingly, the engagement surfaces 460a, 461a of the second valve 46 experience relatively reduced wear from fluid flow thereagainst. The service life of the second valve 46 and the pump (or other device) in which it is included is hence relatively increased. Beneficially, the expense of replacing the second valve or component parts thereof is relatively reduced. Furthermore, a pump including a second valve 46 need have relatively less downtime for replacement of second valves, with consequential savings on the cost of such downtime.

Figure 9:
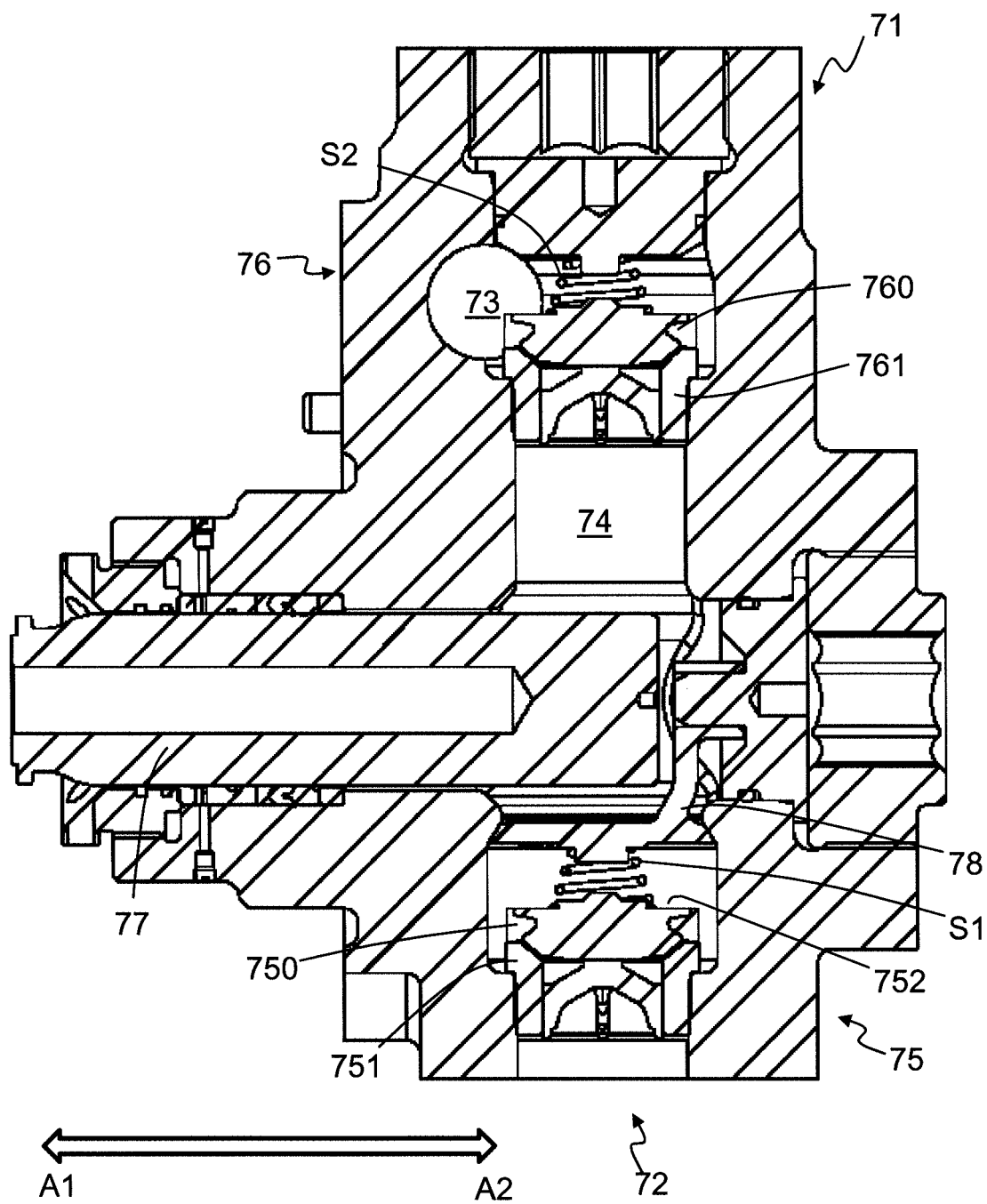
FIG. 9 is a sectional view of a positive displacement pump including a second valve according to an embodiment of the invention.

Referring now to FIG. 9, there is shown a positive displacement pump 71 according to a further embodiment of the invention, wherein like features to those shown in the positive displacement pump 1˜ shown in FIG. 1 are denoted by like references absent the prime (˜) and preceded by a ˜7˜, which will not be described herein further. The positive displacement pump 71 comprises a second valve 76 corresponding to the second valve 46 shown in FIGS. 4, 5a, 5b and 5c and also a first valve 75 including a valve body 750 and valve seat 751 similar to those described above in respect of the valve body 460 and valve seat 461 of second valve 46. In embodiments, the first valve 75 may correspond to the first valve 5˜ of the positive displacement pump 1˜ shown in FIG. 1. In embodiments, the second valve 76 may correspond to the second valve 6˜ of the positive displacement pump 1˜ shown in FIG. 1 whilst the first valve 75 may correspond to the second valve 46 shown in FIGS. 4, 5a, 5b and 5c.

It will be appreciated by those skilled in the art that several variations to the aforementioned embodiments are envisaged without departing from the scope of the invention. For example, although the second valve 46 is described as being used in a positive displacement pump this need not be the case and instead the second valve 46 may find use in any suitable type of device.

It will also be appreciated by those skilled in the art that any number of combinations of the aforementioned features and/or those shown in the appended drawings provide clear advantages over the prior art and are therefore within the scope of the invention described herein.

The invention claimed is:

1. A valve for a positive displacement pump, the valve comprising a valve body and a valve seat each having engagement surfaces which are configured, in use, to at least partially engage with one another when the valve is in a closed position to thereby mitigate fluid flow therethrough, the valve body being movable, in use, relative to the valve seat along a linear path of motion from the closed position to an open position, wherein, when the valve is in the open position, (i) at least a peripheral portion of the engagement surface of the valve body extends at an obtuse angle relative to the linear path of motion in the direction of motion from the closed position to the open position and wherein the length of the peripheral portion is at least 13% of the length of the engagement surface, (ii) an inner portion of the engagement surface of the valve body extends at an acute angle relative to the linear path of motion in the direction of motion from the closed position to the open position, and (iii) at least a peripheral portion of the engagement surface of the valve seat extends perpendicularly relative to the linear path of motion in the direction of motion from the closed position to the open position, and the peripheral portion of the engagement surface of the valve body extending at an obtuse angle overlies the peripheral portion of the engagement surface of the valve seat extending perpendicularly.

2. A valve according to claim 1, wherein, when the valve body and valve seat are in the open condition, the peripheral portion of the engagement surface of the valve body extends at an angle of between about 5 and 20 degrees relative to the peripheral portion of the engagement surface of the valve seat.

3. A pump comprising a valve according to claim 2.

4. A valve according to claim 1, wherein the engagement surface of the valve body comprises an inner portion and an outer portion, where the outer portion comprises the peripheral portion.

5. A valve according to claim 4, wherein the inner portion of the engagement surface of the valve body extends at an angle of between about 20 and 70 degrees relative to the linear path of motion in the direction of motion from the closed position to the open position.

6. A valve according to claim 5, wherein the engagement surface of the valve seat comprises an inner portion and an outer portion, where the outer portion comprises the peripheral portion.

7. A valve according to claim 6, wherein the inner portion of the engagement surface of the valve seat extends at an acute angle relative to the linear path of motion in the direction of motion from the closed position toward the open position.

8. A valve according to claim 7, wherein the inner portion of the engagement surface of the valve seat extends at an angle of between about 20 and 70 degrees relative to the linear path of motion in the direction of motion from the closed position toward the open position.

9. A pump comprising a valve according to claim 8.
10. A pump comprising a valve according to claim 4.
11. A pump comprising a valve according to claim 5.
12. A pump comprising a valve according to claim 6.
13. A pump comprising a valve according to claim 7.
14. A pump comprising a valve according to claim 1.

* * * * *